(12) United States Patent
Laubry

(10) Patent No.: US 7,115,693 B2
(45) Date of Patent: Oct. 3, 2006

(54) METHOD FOR PREPARING BUTADIENE/ISOPRENE COPOLYMERS AND RESULTING COPOLYMERS

(75) Inventor: Philippe Laubry, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/855,354

(22) Filed: May 28, 2004

(65) Prior Publication Data

US 2005/0004333 A1    Jan. 6, 2005

Related U.S. Application Data

(63) Continuation of application No. PCT/EP02/13709, filed on Dec. 4, 2002.

(30) Foreign Application Priority Data

Dec. 7, 2001    (FR) ................... 01/15888

(51) Int. Cl.
C08F 4/54       (2006.01)
C08F 236/06     (2006.01)
C08F 236/08     (2006.01)

(52) U.S. Cl. ............ 526/339; 526/153; 526/161; 526/164

(58) Field of Classification Search ........ 526/153, 526/161, 164, 339
See application file for complete search history.

(56) References Cited

U.S. PATENT DOCUMENTS 6,130,299 A * 10/2000 Sone et al. ............ 526/89

FOREIGN PATENT DOCUMENTS

| EP | 0 629 640 | 12/1994 |
| EP | 0 846 707 | 6/1998 |
| JP | 60023406 | 2/1985 |

OTHER PUBLICATIONS

Monakov Y.B. et al: "Investigation of the Polymerization of Isoprene in the Presence of Catalyst System Containing Lanthanide Salts", Doklady Physical Chemistry, Consultants Burea, New York, NY (pp. 587-589), Jun. 1977.

* cited by examiner

Primary Examiner—Caixia Lu
(74) Attorney, Agent, or Firm—Buchanan Ingersoll & Rooney PC

(57) ABSTRACT

The present invention relates to a process for the preparation random copolymers of butadiene and isoprene, essentially consisting of reacting a catalytic system in the presence of butadiene and isoprene and using, as catalytic system, a system based on at least:—a conjugated diene monomer,—an organic phosphoric acid salt of one or more rare earth metals,—an alkylating agent consisting of an alkylaluminium of the formula $AlR_3$ or $HAlR_2$, and—a halogen donor consisting of an alkylaluminium halide, said salt being in suspension in at least one inert, saturated and aliphatic or alicyclic hydrocarbon solvent, which is included in said catalytic system, and the "alkylating agent:rare earth salt" molar ratio falls within a range of from 1 to 8, and performing the copolymerisation reaction in an inert hydrocarbon polymerisation solvent or without solvent. These copolymers are in particular such that the butadiene and isoprene units which they comprise each have an elevated content of cis-1,4 linkages.

12 Claims, No Drawings

METHOD FOR PREPARING BUTADIENE/ISOPRENE COPOLYMERS AND RESULTING COPOLYMERS

This application is a continuation of International PCT/EP02/13709 filed on Dec. 4, 2002 and which claims priority under 35 U.S.C. §119 to French Patent Application Serial No. 01/15888 filed in France on Dec. 7, 2001.

BACKGROUND OF THE INVENTION

The present invention relates to a process for the preparation of random copolymers of butadiene and isoprene and to such copolymers obtained by this process.

When preparing random copolymers of butadiene and isoprene, i.e. copolymers which are supposed to exhibit an equiprobable or chance distribution of butadiene and isoprene units, it is known to use catalytic systems in particular comprising a salt of a rare earth metal suspended in an inert hydrocarbon solvent, an alkylating agent and a halogen donor.

Butadiene in fact polymerises substantially more rapidly than isoprene with such catalytic systems, resulting in a succession of butadiene units at one end of the copolymer chain of the resultant copolymers, and a succession of isoprene units at the other end.

In its examples of embodiment, European patent specification EP-A-629,640 teaches, for the preparation of random copolymers of butadiene and isoprene, the use of catalytic systems based on:

diisobutylaluminium hydride as alkylating agent, mixed with n-butanol or triphenylsilanol and butadiene,
neodymium neodecanoate or praseodymium octanoate, as rare earth metal salt, and
allyl bromide, as halogen donor.

One major drawback of these catalytic systems lies in the variability of the glass transition temperatures (Tg) of the copolymers obtained when using analogous catalytic systems and polymerisation conditions (see Examples 3 and 4 in which the values of Tg are −97° C. and −90° C. respectively).

Another drawback lies in the fact that each copolymer obtained exhibits a butadiene:isoprene unit content (varying from 1.35:1 to 1.7:1) which differs substantially from the butadiene:isoprene monomer content (approx. 1:1) used for the polymerisation, which means that the butadiene and isoprene are not equally reactive during polymerisation.

As a result, the catalytic systems described in this document do not permit satisfactorily reproducible production of copolymers which are truly random, i.e. in which the butadiene and isoprene exhibit an equiprobable distribution.

SUMMARY OF THE INVENTION

The object of the present invention is to propose a catalytic system which allows these drawbacks to be overcome, and said object is achieved in that the Applicant has unexpectedly discovered that a catalytic system of the "preformed" type based on at least:

a conjugated diene monomer,
an organic phosphoric acid salt of one or more rare earth metals (metals with an atomic number between 57 and 71 in Mendeleev's periodic table), said salt being in suspension in at least one inert, saturated and aliphatic or alicyclic hydrocarbon solvent,
an alkylating agent consisting of an alkylaluminium of formula $AlR_3$ or $HAlR_2$, the "alkylating agent:rare earth salt" molar ratio ranging from 1 to 8, and
a halogen donor consisting of an alkylaluminium halide, when reacted in the presence of butadiene and isoprene in an inert polymerisation solvent or without solvent, allows the preparation of a random copolymer of butadiene and isoprene in which the butadiene and isoprene units succeed one another in a virtually equiprobable manner, in which copolymer said butadiene and isoprene units each comprise a cis-1,4 linkage content of greater than or equal to 95.0%, and which copolymer exhibits a high inherent viscosity.

1,3-Butadiene may be mentioned as a preferred conjugated diene monomer usable for "preforming" the catalytic system of the invention.

Other conjugated dienes which may be mentioned are 2-methyl-1,3-butadiene (or isoprene), 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene or any other conjugated diene having between 4 and 8 carbon atoms.

It will be noted that the "monomer:rare earth salt" molar ratio may have a value ranging from 25 to 50.

According to another characteristic of the invention, said rare earth salt consists of a non-hygroscopic powder having a slight tendency to agglomerate at ambient temperature.

According to a preferred embodiment of the invention, the inert hydrocarbon solvent in which said rare earth salt is suspended is a low molecular weight aliphatic or alicyclic solvent, such as cyclohexane, methylcyclohexane, n-heptane or a mixture of these solvents.

According to another embodiment of the invention, the solvent used to suspend the rare earth salt is a mixture of a high molecular weight aliphatic solvent comprising a paraffinic oil, for example petrolatum oil, and a low molecular weight solvent, such as those mentioned above (for example methylcyclohexane).

This suspension is prepared by dispersive grinding of the rare earth salt in this paraffinic oil in such a manner as to obtain a very fine and homogeneous suspension of the salt.

According to another characteristic of the invention, said catalytic system comprises the rare earth metal in a concentration equal to or substantially equal to 0.02 mol/l.

According to a preferred embodiment of the invention, a tris[bis(2-ethylhexyl)-phosphate] salt of the said rare earth metal or metals is used as the salt.

Even more preferably, said rare earth salt is neodymium tris[bis(2-ethylhexyl)-phosphate].

Alkylating agents usable in the catalytic system of the invention which may be mentioned are alkylaluminiums such as:

trialkylaluminiums, for example triisobutylaluminium, or
dialkylaluminium hydrides, for example diisobutylaluminium hydride.

It will be noted that this alkylating agent preferably consists of diisobutylaluminium hydride (referred to as DiBAH in the remainder of the present description).

Halogen donors usable in the catalytic system of the invention which may be mentioned are alkylaluminium halides, preferably diethylaluminium chloride, (referred to as DEAC in the remainder of the present description).

It will be noted that the "halogen donor:rare earth salt" molar ratio may have a value ranging from 2.6 to 3.

DESCRIPTION OF PREFERRED EMBODIMENTS OF THE INVENTION

According to the invention, the process for preparing said catalytic system comprises performing the following steps:
- in a first optional solvation step, said rare earth salt(s) is/are suspended in said inert hydrocarbon solvent,
- in a second step, said conjugated diene monomer is added to the suspension obtained in the first step or, alternatively, in the event that the first step has not been performed, said solvent is added to said salt in addition to said conjugated diene monomer,
- in a third step, said alkylating agent is added to the suspension obtained on completion of said second step in order to obtain an alkylated salt, and
- in a fourth step, said halogen donor is added to said alkylated salt.

According to one preferred characteristic of the invention, a catalytic system is used which is such that said "alkylating agent:rare earth salt" molar ratio falls within a range of from 1 to 5.

According to another characteristic of the invention, the butadiene and isoprene copolymerisation reaction by means of the above-stated catalytic system may be performed within a range of temperatures of from −30° C. at 100° C.

The random copolymers of butadiene and isoprene obtained by the process according to the invention are such that the butadiene and isoprene units succeed one another in an equiprobable manner, it being possible to express said random succession by Bernoulli's statistical law:

Taking account of the independent binary random variables $Z_i$ relating to the butadiene and isoprene linkages in a copolymer obtained by the process according to the invention, and the probabilities of success $\pi i$ and thus the expectation $E(Z_i)=\pi_i$ associated with these variables, the density functions of said variables are members of the family:

$$f(Z_i, \pi_i) = (1 - \pi_i)\exp\left\{Z_i \ln\left(\frac{\pi_i}{1 - \pi_i}\right)\right\}.$$

This equiprobable linkage of butadiene and isoprene units in the random copolymer according to the invention may also be expressed by the fact that the glass transition temperature $T_{Gexp}$ of said copolymer, measured by the differential enthalpy analysis method, satisfies the following relationship:

$$-0.05 \leq (T_{Gexp}-T_{Gth})/T_{Gth} \leq 0.05$$

and, preferably, the following relationship:

$$-0.02 \leq (T_{Gexp}-T_{Gth})/T_{Gth} \leq 0.02,$$

where $T_{Gth}$ is a theoretical glass transition temperature for said copolymer, calculated in accordance with the Fox equation:

$$1/T_{Gth} = \alpha/T_{G(BR)} + \beta/T_{G(IR)},$$

where $T_{G(BR)}$ and $T_{G(IR)}$ are respectively the glass transition temperatures, measured by the differential enthalpy analysis method, of a polybutadiene and a polyisoprene synthesised by means of said catalytic system.

It will also be noted that the butadiene and isoprene monomers are virtually equally reactive during the copolymerisation reaction performed by means of the process according to the invention, which results in the fact that the mass fractions $X_b$ and $X_i$ of butadiene and isoprene units in said copolymer and the mass fractions $x_b$ and $x_i$ of butadiene and isoprene monomers used fulfil the following relationships:

$$-0.04 \leq (X_b-x_b)/x_b \leq 0.04 \text{ and } -0.04 \leq (X_i-x_i)/x_i \leq 0.04.$$

The microstructure of the copolymers of butadiene and isoprene according to the invention is such that the butadiene and isoprene units present in these copolymers each comprise a cis-1,4 linkage content, measured by the carbon 13 nuclear magnetic resonance method or by near infrared analysis, which is greater than or equal to 95.0%, preferably greater than or equal to 98.0% and, even more preferably, equal to 99.0%.

It will also be noted that cis-1,4 linkage content range takes account of measurements made, on the one hand, by the near infrared analysis method after calibration of the copolymer samples carried out by $^{13}$C-NMR analysis and, on the other hand, by $^{13}$C-NMR analysis (this analysis exhibiting measurement uncertainty of ±0.1%). These cis-1,4 linkage content values are thus more precise than such content values hitherto stated in the prior art.

It will moreover be noted that these particularly high cis-1,4 linkage contents obtained for the butadiene and isoprene units of a copolymer according to the invention are independent of the quantity of catalytic system used.

With regard to the inherent viscosity of these copolymers according to the invention, said viscosity, measured at 25° C. and a concentration of 0.1 g/dl in toluene, is greater than or equal to 2.5 dl/g, advantageously greater than or equal to 3.0 dl/g.

The above-stated, and further, features of the present invention are disclosed in greater detail in the following description of several exemplary embodiments of the invention, which are stated by way of illustrative, non-limiting examples.

I. Preparation of Catalytic Systems of the Invention

1) Synthesis of an Organic Phosphate Salt of Neodymium According to the Invention A plurality of tests was carried out for synthesis of this salt. The same synthesis method, which is described in detail below, was used for each of these tests.

a) Synthesis of an Aqueous Solution of Neodymium $NdCl_3$, $6H_2O$:

96 g of $Nd_2O_3$ (sold by RHODIA), which has been determined by complexation analysis to have an Nd content of 85.3% (theoretical value 85.7%), so amounting to 0.57 mol of Nd, are weighed out into a "tall" form 600 ml beaker.

80 ml of demineralised water are added. Under a fume hood, 150 ml of 36 wt. % concentrated HCl (d=1.18), namely 1.75 mol of HCl (molar ratio HCl:Nd=1.75:0.57=3.07), are slowly added at ambient temperature while the mixture is stirred with a magnetic stirrer.

The reaction $Nd_2O_3 + 6 HCl + 9 H_2O \rightarrow 2 NdCl_3, 6H_2O$ is highly exothermic.

Once all the hydrochloric acid has been added, the solution is raised to boiling while being stirred with a magnetic stirrer, to eliminate the excess hydrochloric acid. The aqueous $NdCl_3$ solution is clear and mauve in colour. No insoluble product ($Nd_2O_3$) remains.

This solution is then evaporated until a volume of 130 ml remains in the beaker. The $NdCl_3$, $6H_2O$ is then highly concentrated (it crystallises at ambient temperature).

The concentrated solution of $NdCl_3$ is then poured into a 10 litre drum containing 4500 ml of demineralised water at ambient temperature while the mixture is stirred (using a motor with an anchor agitator).

The pH of the solution, measured at 25° C., is close to 4.

1500 ml of technical grade acetone are then added to the solution. No insoluble product remains and the resultant solution is pink in colour.

b) Synthesis of an Organic Sodium Phosphate of Formula [RO]$_2$P(O)ONa (R=2-ethylhexyl):

68 g, or 1.70 mol, of NaOH flakes are dissolved in a 5 litre beaker containing 1500 ml of demineralised water. 554 g of an organic phosphoric acid (bis(2-ethylhexyl)phosphoric acid, listed in the "Aldrich" catalogue under number 23,782-5), namely 1.72 mol of this acid, are dissolved in another 3 litre beaker containing 500 ml of acetone. The molar ratio NaOH:organic phosphoric acid is 1.70:1.72 or 0.99.

At ambient temperature and while stirring the mixture by hand with a glass stirrer, the solution of said organic phosphoric acid is poured into the NaOH solution. The reaction is as follows:

[RO]$_2$P(O)OH+NaOH→[RO]$_2$P(O)ONa+H$_2$O.

The reaction is slightly exothermic and a homogeneous solution of a yellowish colour is obtained. The pH of the solution, measured at 25° C., is close to 7.

c) Synthesis of a Phosphated Neodymium Salt of the Formula [[RO]$_2$P(O)O]$_3$Nd:

At ambient temperature and while the mixture is being vigorously stirred (motor with anchor agitator), the organic Na phosphate salt obtained in paragraph b) above is poured into the aqueous solution of NdCl$_3$, 6H$_2$O obtained in paragraph a) above.

A very fine white precipitate forms immediately. Stirring of the resultant mixture is continued for 30 minutes once all the organic Na phosphate has been added (in a molar ratio (RO)$_2$P(O)ONa:NdCl$_3$=1.70:0.57=2.98). The reaction is as follows:

3[RO]$_2$P(O)ONa+NdCl$_3$,6H$_2$O→Nd[OP(O)[OR]$_2$]$_3$+3 NaCl+6H$_2$O.

The resultant phosphated neodymium salt is recovered and washed in a centrifuge equipped with a "sock".

The pH of the "mother liquors" is between 3 and 4 at 25° C. These "mother liquors" are colourless and clear.

The salt obtained is divided into two samples, then each sample is washed with an acetone/demineralised water mixture, performing the washing cycle described below three times in order to remove all the chlorides.

Each washing cycle is performed in a 10 litre plastic bucket initially containing 2 litres of acetone. Each sample is then homogenised with the acetone using an "Ultra-Turrax" homogeniser for approx. 1 minute in order to obtain a milky solution.

4 liters of demineralised water are then added to the bucket and the resultant mixture is homogenised for 3 minutes using the same homogeniser.

The resultant mixture is centrifuged and the phosphated neodymium salt is recovered in the "sock".

The qualitative analytic test for chlorides is virtually negative for the final washing water (the reaction is as follows: NaCl+AgNO$_3$ (HNO$_3$ medium)→AgCl↓+NaNO$_3$).

The neodymium salt washed in this manner is dried in an oven at 60° C. under a vacuum and with air-flow for approx. 80 hours.

The final yield for each of the synthesis tests performed is between 95% and 98%, depending upon the losses arising during washing. In each case, approx. 600 g of dry phosphated neodymium salt are obtained.

The mass contents of neodymium, determined both by complexometric back titration with ethylenediaminetetraacetic acid (EDTA) and by inductively-coupled plasma atomic emission spectrometry (ICP-AES), are substantially between 12.5% and 12.8% (with a theoretical content τ of 13.01% where τ=[144.24/1108.50]×100, where 144.24 g/mol=molar mass of neodymium).

For each of these two methods, the neodymium content measurements were performed after wet acid mineralisation of the salt, either in a sand bath in an open system or in a microwave oven in a closed system.

The complexometric back titration with EDTA involves back titration with complexation of neodymium with an excess of EDTA (ethylenediaminetetraacetic acid), in which the excess EDTA is determined at pH=4.6 with zinc sulfate.

A coloured indicator was used with photometric detection of the equivalence point.

Inductively-coupled plasma atomic emission spectrometry is an elemental analytical method based on the observation of the radiation emitted by atoms raised to an excited state in a plasma.

The emitted radiation used for analysis of neodymium corresponds to wavelengths of 406.109 nm and 401.225 nm.

This spectrometric method was implemented by previously calibrating the system with "control" neodymium salts having a known neodymium content.

The following table shows the Nd contents obtained by means of these two methods (the number of tests performed on each salt sample is shown in brackets).

| Salt samples analysed | Percentage Nd content by complexometric titration | Percentage Nd content by ICP/AES | Relative deviation between the 2 methods |
|---|---|---|---|
| Phosphated Nd salt [[RO]$_2$P(O)O]$_3$Nd | 12.8 (9) | 12.8 (3) | 0% |
| Phosphated Nd salt [[RO]$_2$P(O)O]$_3$Nd | 12.8 (4) | 12.6 (3) | 1.6% |
| Phosphated Nd salt [[RO]$_2$P(O)O]$_3$Nd | 12.7 (6) | 12.2 (4) | 4% |
| Phosphated Nd salt [[RO]$_2$P(O)O]$_3$Nd | 12.6 (6) | 12.5 (4) | 0.8% |
| "Control" Nd acetylacetonate | 31.7 (6) | 32.4 (4) | 2.2% |
| "Control" Nd oxalate | 37.7 (3) | 38.0 (3) | 0.8% |

The results obtained by the two methods are comparable (relative deviation <4%).

2) Synthesis of "Preformed" Catalytic Systems According to the Invention a) Composition of Catalytic Systems According to the Invention:

Each of these systems comprises a phosphated neodymium salt as synthesised according to paragraph 1) above, said salt being in suspension in a low molecular weight inert hydrocarbon solvent (consisting of cyclohexane, hereinafter abbreviated to "CH", or methylcyclohexane, hereinafter abbreviated to "MCH").

These catalytic systems are characterised by the following relative molar ratios, with respect to the neodymium salt:

Nd salt:butadiene (Bd hereafter):DiBAH:DEAC=1:50: 3–6:3.

b) Synthesis Process for these Catalytic Systems:

First Step:

In order to obtain these catalytic systems, 15.6 g of the neodymium salt is poured in powder form into a 1 litre reactor from which any impurities had previously been removed. This salt is then subjected to nitrogen bubbling from the bottom of the reactor for a period of 15 minutes.

Second Step:

90% (mass fraction) of the solvent stated in paragraph a) above is introduced into the reactor containing the neodymium salt.

When the solvent used is cyclohexane, the contact time of the neodymium salt with this solvent varies from 2 hours to 4 hours, and the contact temperature varies from 30° C. to 60° C. When the solvent used is methylcyclohexane, the contact time of the neodymium salt with this solvent is 30 min., and the contact temperature is 30° C.

Third Step:

Butadiene is then introduced into the reactor (in the salt:butadiene molar ratio of 1:50 stated in paragraph a) above), at a temperature of 30° C., with the aim of "preforming" each catalytic system.

Fourth Step:

Diisobutylaluminium hydride (DiBAH) is then introduced into the reactor as the alkylating agent for the neodymium salt in a concentration of approx. 1 M, together with a quantity of the solvent already stated in the second step corresponding to a mass fraction of 5% of the entire quantity of said solvent. Alkylation time is 15 min. and the alkylation reaction temperature is 30° C.

Fifth Step:

Diethylaluminium chloride (DEAC) is then introduced into the reactor as the halogen donor in a concentration of approx. 1 M, together with a quantity of the solvent already stated in the second step corresponding to a remaining mass fraction of 5% of the entire quantity of said solvent. The temperature of the reaction medium is adjusted to 60° C.

Sixth Step:

The resultant mixture is then "preformed" (or aged) by maintaining this temperature of 60° C. for a period varying from 2 hours to 4 hours.

Seventh Step:

In this manner, approx. 700 ml of a solution of catalytic system are obtained. The reactor is emptied and the contents transferred into a 750 ml "Steinie" bottle, which has previously been washed, dried and subjected to nitrogen bubbling.

Finally, the catalytic solution is stored under a nitrogen atmosphere in a freezer at a temperature of −15° C.

TABLE 1

Details of catalytic systems prepared:

| Catalytic systems | Solvation (solvent/time/T) | Bd: Nd (mol) | Al: Nd (mol) | Alkylation time/T | Cl: Nd (mol) | Preforming with DEAC time/T |
|---|---|---|---|---|---|---|
| System 1 | CH 2 h, 60° C. | 50 | 6 | 15 min./30° C. | 3 | 2 h, 60° C. |
| System 2 | CH 2 h, 60° C. | 50 | 4 | 15 min./30° C. | 3 | 2 h, 60° C. |
| System 3 | CH 2 h, 60° C. | 50 | 4 | 15 min./30° C. | 3 | 2 h, 60° C. |
| System 4 | CH 2 h, 60° C. | 50 | 4 | 15 min./30° C. | 3 | 4 h, 60° C. |
| System 5 | CH 2 h, 60° C. | 50 | 4 | 15 min./30° C. | 3 | 4 h, 60° C. |
| System 6 | CH 2 h, 30° C. | 50 | 4 | 15 min./30° C. | 3 | 4 h, 60° C. |
| System 7 | CH 2 h, 30° C. | 50 | 4 | 15 min./30° C. | 3 | 4 h, 60° C. |
| System 8 | CH 2 h, 30° C. | 50 | 4.5 | 15 min./30° C. | 3 | 4 h, 60° C. |
| System 9 | CH 4 h, 60° C. | 50 | 3 | 15 min./30° C. | 3 | 2 h, 60° C. |
| System 10 | CH 2 h, 30° C. | 50 | 4 | 15 min./30° C. | 3 | 4 h, 60° C. |
| System 11 | CH 4 h, 60° C. | 50 | 3 | 15 min./30° C. | 3 | 2 h, 60° C. |
| System 12 | MCH 30 min., 30° C. | 50 | 3 | 15 min./30° C. | 3 | 4 h, 60° C. |
| System 13 | MCH 30 min., 30° C. | 50 | 3 | 15 min./30° C. | 3 | 2 h, 60° C. |

II. Copolymerisation of Butadiene and Isoprene by Means of the Above-stated Catalytic Systems 1) Polymerisation Processes Performed:

Twenty polymerisation tests denoted A to T in Table 2 below were carried out to obtain copolymers of butadiene and isoprene, with the exception of tests D, G and S which resulted in isoprene homopolymers and tests C and H which resulted in butadiene homopolymers.

The polymerisation reactions were carried out either in solution (the solvent being cyclohexane) for tests A, B, C, D, E, F, I, N, O, P, Q, R, S, T, or as bulk reactions for tests G, H, J, K, L, and M.

The following were used as polymerisation reactors:

for tests C and D: a 250 ml "Steinie" bottle, polymerisation being carried with stirring in a water tank;

for tests E, F, I, N, O. P, Q, R, S, T: a 70 litre reactor comprising a jacket and a stirring system;

for tests G, H, J, K, L, M: a Werner reactor consisting of a 2 liter jacketed metal tank and a condenser allowing reactor pressure to be controlled. Stirring is carried out with two blades rotating in opposite directions and at different rotational speeds;

for tests A and B: a 14 liter tank with a jacket and stirring system.

It will be noted that tests A and B relate to continuous syntheses, while all the others relate to batch syntheses.

The isoprene used as comonomer was isolated in the laboratory in conventional manner from a steam-cracked C5 naphtha fraction by distilling this C5 fraction over maleic anhydride to remove any residual cyclopentadiene, then passing it through an alumina column to remove polar impurities and bubbling it with nitrogen for 20 minutes immediately prior to the polymerisation reaction.

The quantity of neodymium catalytic base was varied in the various polymerisation tests from 30 µmol to 520 µmol per 100 g of monomer (quantity of neodymium hereinafter stated in µMcm). With regard to test H (polymerisation carried out without solvent), 650 µMcm of diisobutylaluminium hydride (DiBAH) were added to the butadiene prior to addition of the catalytic system.

At the end of polymerisation, acetylacetone was added (in an acetylacetone:neodymium molar ratio substantially equal to 30) to terminate the reaction and N-1,3-dimethylbutyl- N'-phenyl-phenylenediamine (abbreviated to 6PPD) was added as a protection agent (in a quantity of 0.2 phr).

2) Results Obtained

The monomer conversion rate as a function of reaction lime is measured to describe the polymerisation kinetics.

Inherent viscosity $\eta_{inh}$ at 0.1 g/dl in toluene and Mooney viscosity ML(1+4) (measured in accordance with Standard ASTM D-1646) characterise the macrostructure of each polymer.

The glass transition temperature Tg of each polymer obtained is measured by the differential enthalpy analysis method (DSC) using a differential calorimeter sold under the name "METTLER TOLEDO STAR SYSTEM".

The microstructure of the polymers obtained was determined by using either $^{13}$C-NMR analysis (carbon 13 nuclear magnetic resonance, absolute method with an uncertainty of within 0.1%, indicated * in Table 2 below) or NIR analysis (near infrared, used for all other measurements). These methods made it possible to establish the content of butadiene and isoprene units together with the cis-1,4 linkage content.

The first $^{13}$C-NMR analytical method was carried out using a commercially available "BRUKER AM250" spectrophotometer.

The second NIR analysis method was carried out using a commercially available "BRUKER IFS25" spectrophotometer in the harmonic vibration and combination range with polymer samples which had previously been calibrated for the $^{13}$C-NMR analysis (mathematical processing renders this NIR method "quantitative").

This NIR analysis is an indirect method making use of "control" elastomers, the microstructure of which has been measured by $^{13}$C-NMR analysis. The quantitative relationship (Beer-Lambert law) prevailing between the distribution of the monomers in an elastomer and the shape of the elastomer's NIR spectrum is exploited. This method is carried out in two steps—calibration and measurement:

a) Calibration:

Spectra of the "control" elastomers are acquired.

A mathematical model is constructed which associates a microstructure to a given spectrum using the PLS (partial least squares) regression method, which is based on a factorial analysis of the spectral data. The following two documents provide a thorough description of the theory and practice of this "multi-variant" method of data analysis:

(1) P. GELADI and B. R. KOWALSKI "Partial Least Squares regression: a tutorial", Analytica Chimica Acta, vol. 185, 1–17 (1986).

(2) M. TENENHAUS "La regression PLS—Théorie et pratique"Paris, Editions Technip (1998).

b) Measurement:

The spectrum of the sample is recorded.

The microstructure is calculated.

Table 2 below details the operating conditions used for each polymerisation and the macro- and microstructural properties of each elastomer obtained.

TABLE 2

| | Table 1 | | | Copolymerisation reaction | | | | | | Copolymer of butadiene (but.) & isoprene (isop.) | | |
|---|---|---|---|---|---|---|---|---|---|---|---|---|
| | catalyt. | | | (S = solvent & M = monomers but. + isop.) | | | | | | | | Tg |
| | system | | | But./isop. | | | React. | Conv. | | | | But./isop. measured/ |
| Test | No. | Al: Nd | Nd in µMcm | feed (%) | S/M | T (° C.) | time (min.) | rate (%) | $\eta_{inh}$ dl/g | ML (1 + 4) | But./isop. in polymer | cis-1,4 (%) | Tg calc. (° C.) |
| A | 1 | 6 | 90 | 30/70 | 4 | 90 | 90 | 68 | 2.81 | 50 | 29/71 | 96/97 | −78/−78.5 |
| B | 1 | 6 | 95 | 48/52 | 5 | 80 | 55 | 73 | 2.79 | 54 | 47/53 | 96/96 | −86/−87 |
| C | 2 | 4 | 520 | 100/0 | 7 | 60 | 15 | 100 | 2.50 | 43 | 100/0 | 93 | −108/— |
| D | 3 | 4 | 130 | 0/100 | 9 | 50 | 130 | 100 | 4.29 | 83 | 0*/100* | 98* | −63/— |
| E | 4 | 4 | 140 | 20/80 | 7 | 60 | 80 | 91 | 3.13 | 59 | 21/79 | 97/97 | −73/−74.5 |
| F | 4 | 4 | 160 | 40/60 | 7 | 60 | 50 | 91 | 3.02 | 59 | 41/59 | 97/97 | −83/−84 |
| G | 5 | 4 | 55 | 0/100 | 0 | 55 | 20 | 73 | 4.41 | 81 | 0*/100* | 97.5* | −63/— |
| H | 6 | 4 | 30 | 100/0 | 0 | 30 | 30 | 91 | 2.74 | 47 | 100*/0* | 99 & 98* | −108/— |
| I | 7 | 4 | 170 | 28/72 | 7 | 60 | 5 | 20 | — | — | 27/73 | 97/97 | — |
| | | | | | | | 10 | 41 | — | — | 24/76 | 99/97 | — |
| | | | | | | | 15 | 57 | — | — | 25/75 | 99/97 | — |
| | | | | | | | 25 | 79 | — | — | 27/73 | 98/97 | — |
| | | | | | | | 40 | 92 | 3.08 | 54 | 27/73 | 98/97 | −77/−77 |
| J | 8 | 4.5 | 190 | 50/50 | 0 | 55 | 10 | 84 | 2.90 | 53 | 49/51 | 95/97 | −89/−88 |
| K | 8 | 4.5 | 190 | 50/50 | 0 | 55 | 40 | 90 | 3.11 | 59 | 52/48 | 95/97 | −90/−89 |
| L | 9 | 3 | 140 | 20/80 | 0 | 55 | 60 | 88 | 3.17 | 59 | 20/80 | 92/97 | −74/−74 |
| M | 10 | 4 | 120 | 20/80 | 0 | 55 | 60 | 84 | 3.26 | 60 | 19/81 | 95/99 | −73/−73.5 |
| N | 11 | 3 | 150 | 20/80 | 7 | 60 | 60 | 92 | 3.47 | 63 | 20*/80* | 99*/98* | −74/−74 |
| O | 11 | 3 | 160 | 20/80 | 7 | 60 | 6 | 17 | — | — | 21/79 | 95/98 | — |
| | | | | | | | 10 | 28 | — | — | 20/80 | 96/98 | −73/— |
| | | | | | | | 20 | 55 | 2.84 | — | 20/80 | 98/99 | −74/— |
| | | | | | | | 30 | 66 | 3.14 | — | 20/80 | 99/99 | −73/— |
| | | | | | | | 45 | 79 | 3.21 | — | 20/80 | 99/98 | −74/— |
| | | | | | | | 60 | 86 | 3.33 | — | 20/80 | 98/99 | −73/— |
| | | | | | | | 70 | 89 | 3.53 | 64 | 20/80 | 99/98 | −74/−74 |
| P | 11 | 3 | 170 | 20/80 | 7 | 60 | 3 | 9 | — | — | 20/80 | 99/96 | — |
| | | | | | | | 6 | 19 | — | — | 20/80 | 99/97 | — |
| | | | | | | | 10 | 34 | — | — | 20/80 | 99/98 | −74/— |
| | | | | | | | 20 | 60 | 2.85 | — | 20/80 | 99/99 | −74/— |
| | | | | | | | 30 | 76 | 3.03 | — | 20/80 | 99/98 | −74/— |
| | | | | | | | 45 | 89 | 3.19 | — | 21/79 | 99/99 | −74/— |
| | | | | | | | 60 | 92 | 3.37 | 59 | 20/80 | 99/98 | −74/−74 |

TABLE 2-continued

| Test | Table 1 catalyt. system No. | Al: Nd | Nd in μMcm | Copolymerisation reaction (S = solvent & M = monomers but. + isop.) But./isop. feed (%) | S/M | T (° C.) | React. time (min.) | Conv. rate (%) | Copolymer of butadiene (but.) & isoprene (isop.) $\eta_{inh}$ dl/g | ML (1 + 4) | But./isop. in polymer | cis-1,4 (%) | Tg But./isop. measured/ Tg calc. (° C.) |
|---|---|---|---|---|---|---|---|---|---|---|---|---|---|
| Q | 11 | 3 | 195 | 40/60 | 7 | 60 | 2 | 11 | 1.49 | — | 40/60 | 95/98 | −82/— |
|   |    |   |     |       |   |    | 5  | 29 | 2.05 | — | 39/61 | 97/99 | −82/— |
|   |    |   |     |       |   |    | 10 | 55 | 2.58 | — | 38/62 | 98/98 | −82/— |
|   |    |   |     |       |   |    | 15 | 72 | 2.76 | — | 38/62 | 99/98 | — |
|   |    |   |     |       |   |    | 20 | 81 | 2.87 | — | 40/60 | 98/99 | −83/— |
|   |    |   |     |       |   |    | 30 | 90 | 2.97 | — | — | — | — |
|   |    |   |     |       |   |    | 40 | 94 | 3.12 | 61 | 38/62 | 99/98 | −84/−83 |
| R | 11 | 3 | 195 | 40/60 | 7 | 60 | 40 | 92 | 3.05 | 61 | 40/60 | 97/98 | −84/−83 |
| S | 12 | 3 | 125 | 0/100 | 9 | 50 | 120 | 91 | 4.25 | 80 | 0*/100* | 98 & 98* | −63/— |
| T | 13 | 3 | 155 | 26/74 | 7 | 60 | 40 | 97 | 3.07 | 54 | 23/77 | 99/97 | −76/−75.5 |

In the light of these results, it will be noted that the copolymers of butadiene and isoprene obtained (see tests A, B, E, F, I to R and T) exhibit, at different conversion rates, contents of butadiene and isoprene units which are respectively identical or virtually identical (to within ±4%) to the content of butadiene and isoprene monomers used as polymerisation feed, which shows that these monomers are virtually equally reactive during the copolymerisation reaction.

The extremely randomising nature of the catalytic systems according to the invention has thus been demonstrated and is confirmed by the fact that the glass transition temperature $T_{Gexp}$ of each butadiene and isoprene copolymer, measured by the differential enthalpy analysis method, is identical or virtually identical to the theoretical glass transition temperature $T_{Gth}$ of said copolymer (whether polymerisation is performed continuously or batchwise and at any conversion rate), calculated in accordance with the Fox equation:

$1/T_{Gth} = \alpha/T_{G(BR)} + \beta/T_{G(IR)}$, where $T_{G(BR)}$ and $T_{G(IR)}$ are respectively the glass transition temperatures, measured by the same differential enthalpy analysis method, of a polybutadiene and a polyisoprene synthesised by means of the same catalytic system.

It will furthermore be noted that, in these copolymers according to the invention, the butadiene and isoprene units each comprise a cis-1,4 linkage content, measured by the carbon 13 nuclear magnetic resonance method or by near infrared analysis, which is generally greater than or equal to 95.0%.

What is claimed is:

1. A process for preparing Bernoulli's statistical random copolymers of butadiene and isoprene, said process comprising copolymerizing butadiene and isoprene in the presence of a catalyst system comprising:
    (a) a conjugated diene monomer;
    (b) an organic phosphoric acid salt of at least one rare earth metal;
    (c) an alkylaluminum alkylating agent of the formula $AlR_3$ or $HAlR_2$ where R is an alkyl group; and
    (d) an alkylaluminum halide halogen donor,
    said salt being in suspension in at least one inert, saturated and aliphatic or alicyclic hydrocarbon solvent which is included in said catalytic system, the alkylating agent: rare earth salt molar ratio having a value of from 1 to 8, and wherein the copolymerization reaction optionally is conducted in an inert hydrocarbon solvent.

2. A process for the preparation of a random copolymer of butadiene and isoprene according to claim 1, wherein rare earth salt is a rare earth tris[bis(2-ethylhexyl)phosphate].

3. A process for the preparation of a random copolymer of butadiene and isoprene according to claim 1, wherein said rare earth metal or metals is present in a concentration equal to 0.02 mol/l.

4. A process for the preparation of a random copolymer of butadiene and isoprene according to claim 1, wherein the halogen donor:salt molar ratio falls within a range of from 2.6 to 3.

5. A process for the preparation of a random copolymer of butadiene and isoprene according to claim 1, wherein the conjugated diene monomer:salt molar ratio falls within a range of from 25 to 50.

6. A process for the preparation of a random copolymer of butadiene and isoprene according to claim 1, wherein said conjugated diene monomer is butadiene.

7. A process for the preparation of a random copolymer of butadiene and isoprene according to claim 1, wherein said alkylating agent is diisobutylaluminium hydride.

8. A process for the preparation of a random copolymer of butadiene and isoprene according to claim 1, wherein said halogen donor is diethylaluminum chloride.

9. The process for the preparation of a random copolymer of butadiene and isoprene according to claim 1, wherein the alkylating agent:rare earth salt molar ratio falls within a range of from 1 to 5.

10. The process for the preparation of a random copolymer of butadiene and isoprene according to one claim 1, wherein the butadiene and isoprene monomers are virtually equally reactive during the copolymerization reaction, such that the mass fractions $X_b$ and $X_i$ of butadiene and isoprene units in said copolymer and the mass fractions $x_b$ and $x_i$ of butadiene and isoprene monomers used fulfil the following relationships:

$-0.04 \leq (X_b - x_b)/x_b < 0.04$ and $-0.04 \leq (X_i - x_i)/x_i \leq 0.04$.

11. A process for the preparation of a random copolymer of butadiene and isoprene according to claim 1, wherein said copolymerization reaction is conducted at a temperature of from −30° C. to 100° C.

12. The process according to claim 2, wherein said rare earth salt is neodymium tris[bis(2-ethylhexyl)phosphate].

* * * * *